United States Patent
Kobayashi et al.

(10) Patent No.: US 11,208,516 B2
(45) Date of Patent: Dec. 28, 2021

(54) COMPOSITION, CURED PRODUCT, STORAGE CONTAINER, IMAGE FORMING APPARATUS, AND IMAGE FORMING METHOD

(71) Applicant: RICOH COMPANY, LTD., Tokyo (JP)

(72) Inventors: Masahide Kobayashi, Kanagawa (JP); Mitsunobu Morita, Shizuoka (JP); Takenori Suenaga, Kanagawa (JP); Soh Noguchi, Kanagawa (JP); Takashi Okada, Kanagawa (JP); Tatsuki Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 152 days.

(21) Appl. No.: 16/523,657

(22) Filed: Jul. 26, 2019

(65) Prior Publication Data
US 2020/0031969 A1    Jan. 30, 2020

(30) Foreign Application Priority Data

Jul. 30, 2018 (JP) .............. JP2018-142150
Jul. 2, 2019 (JP) .............. JP2019-123510

(51) Int. Cl.
C09D 11/101 (2014.01)
C09D 11/107 (2014.01)
(Continued)

(52) U.S. Cl.
CPC .......... C08F 220/58 (2013.01); B29C 64/112 (2017.08); B29C 64/255 (2017.08);
(Continued)

(58) Field of Classification Search
None
See application file for complete search history.

(56) References Cited

U.S. PATENT DOCUMENTS 10,174,215 B2   1/2019   Morita et al.
2014/0363634 A1  12/2014  Morita et al.
(Continued)

FOREIGN PATENT DOCUMENTS

JP   2012-116934   6/2012
JP   2012-158638   8/2012
(Continued)

OTHER PUBLICATIONS

SciFinder Search (Year: 2021).*

*Primary Examiner* — Vu A Nguyen
(74) *Attorney, Agent, or Firm* — Grüneberg and Myers PLLC

(57) ABSTRACT

Provided is a composition including an acrylamide compound having a molecular weight of 150 or greater but 250 or less (A1), and a monomer having a cyclic structure represented by General Formula (3) below, or General Formula (4) below, or both (A2),

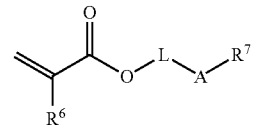

General Formula (3)

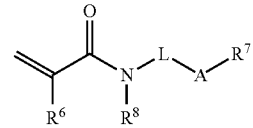

General Formula (4)

where, in General Formulae (3) and (4), L is a single bond or a straight chain or branched alkylene group that has from
(Continued)

1 through 10 carbon atoms and may include an oxygen atom, a nitrogen atom, or a sulfur atom; A is a cyclic structure that has from 2 through 10 carbon atoms and may include an oxygen atom, a nitrogen atom, or a sulfur atom; $R^6$ is a hydrogen atom or a methyl group; and $R^7$ and $R^8$ are each a straight chain or branched alkyl group having from 1 through 10 carbon atoms.

15 Claims, 2 Drawing Sheets

(51) Int. Cl.

| | | |
|---|---|---|
| *C09D 11/30* | (2014.01) | |
| *C08F 220/58* | (2006.01) | |
| *B41M 7/00* | (2006.01) | |
| *B33Y 70/00* | (2020.01) | |
| *B33Y 30/00* | (2015.01) | |
| *B33Y 10/00* | (2015.01) | |
| *B29C 64/264* | (2017.01) | |
| *B41M 5/00* | (2006.01) | |
| *B29C 64/255* | (2017.01) | |
| *B29C 64/112* | (2017.01) | |
| *B29K 33/00* | (2006.01) | |
| *B33Y 80/00* | (2015.01) | |

(52) U.S. Cl.
CPC ............ *B29C 64/264* (2017.08); *B33Y 10/00* (2014.12); *B33Y 30/00* (2014.12); *B33Y 70/00* (2014.12); *B41M 5/0023* (2013.01); *B41M 7/0081* (2013.01); *C09D 11/107* (2013.01); *C09D 11/30* (2013.01); *B29K 2033/26* (2013.01); *B33Y 80/00* (2014.12)

(56) References Cited

U.S. PATENT DOCUMENTS

| | | | |
|---|---|---|---|
| 2017/0253680 | A1 | 9/2017 | Yamada |
| 2017/0260405 | A1 | 9/2017 | Kumai et al. |
| 2017/0327705 | A1 | 11/2017 | Yamada |
| 2018/0127607 | A1 | 5/2018 | Morita et al. |
| 2018/0333909 | A1 | 11/2018 | Arita et al. |
| 2019/0023924 | A1* | 1/2019 | Yamada ............ C08F 20/56 |
| 2019/0023941 | A1* | 1/2019 | Ford ............ C09D 179/08 |

FOREIGN PATENT DOCUMENTS

| | | |
|---|---|---|
| JP | 2015-013980 | 1/2015 |
| JP | 2018-080321 | 5/2018 |

\* cited by examiner

COMPOSITION, CURED PRODUCT, STORAGE CONTAINER, IMAGE FORMING APPARATUS, AND IMAGE FORMING METHOD

CROSS-REFERENCE TO RELATED APPLICATIONS

The present application claims priority under 35 U.S.C. § 119 to Japanese Patent Application No. 2018-142150 filed Jul. 30, 2018, and Japanese Patent Application No. 2019-123510 filed Jul. 2, 2019. The contents of which are incorporated herein by reference in their entirety.

BACKGROUND OF THE INVENTION

Field of the Invention

The present disclosure relates to a composition, a cured product, a storage container, an image forming apparatus, and an image forming method.

Description of the Related Art

As active energy ray-curable inks used for an inkjet printing system, radical polymerizable inks or cationic polymerizable inks have been used. Among such inks, radical polymerizable inks have been widely used in view of a production cost of inks and storage stability of inks.

As such a radical polymerizable ink, known is an ink including a polymerizable monomer, such as acrylic acid ester, and a polymerization initiator that generates radicals when active energy rays are applied.

Moreover, a photocurable inkjet printing ink is desired to have high adhesion to a base material as well as having high curability. However, a cured film formed with a photocurable inkjet printing ink composition having high curability generally tends to have low adhesion to a base material.

In order to improve adhesion of the cured film to a base material, such as polyethylene terephthalate (PET) and polypropylene (PP), there is an attempt to add a component for improving adhesion into a photocurable inkjet printing ink composition. For example, an epoxy group-containing polymer is used as the component for improving adhesion in Japanese Unexamined Patent Application Publication No. 2012-158638. Moreover, N-vinylcaprolactam is used in Japanese Unexamined Patent Application Publication No. 2012-116934.

In recent years, moreover, a light source used for a photocurable inkjet printing ink composition has been changed from mercury lamps or metal halide lamps to light emitting diodes (LED) in view of protection of the environment. In view of production efficiency, moreover, desired is a photocurable inkjet printing ink composition that can be sufficiently cured even when irradiation energy of a LED is small (for example, integrated light dose is 500 mJ/cm$^2$ or less).

SUMMARY OF THE INVENTION

According to one aspect of the present disclosure, a composition includes an acrylamide compound having a molecular weight of 150 or greater but 250 or less (A1), and a monomer having a cyclic structure represented by General Formula (3) below, or General Formula (4) below, or both (A2).

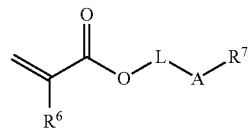

General Formula (3)

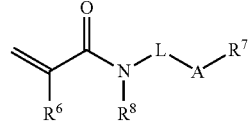

General Formula (4)

In General Formulae (3) and (4), L is a single bond or a straight chain or branched alkylene group that has from 1 through 10 carbon atoms and may include an oxygen atom, a nitrogen atom, or a sulfur atom; A is a cyclic structure that has from 2 through 10 carbon atoms and may include an oxygen atom, a nitrogen atom, or a sulfur atom; $R^6$ is a hydrogen atom or a methyl group; and $R^7$ and $R^8$ are each a straight chain or branched alkyl group having from 1 through 10 carbon atoms.

DESCRIPTION OF THE EMBODIMENTS

Composition

Figure 1:
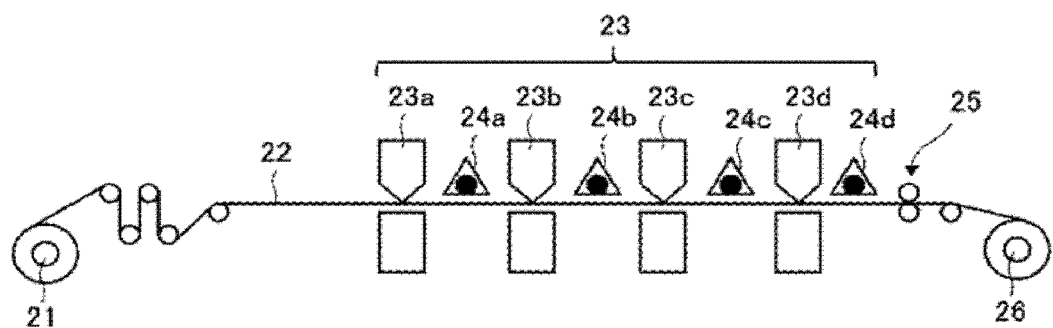
FIG. 1 is a schematic view illustrating an example of an image forming apparatus including an inkjet ejection unit.

A composition of the present disclosure includes an acrylamide compound having a molecular weight of 150 or greater but 250 or less (A1), and a monomer having a cyclic structure represented by General Formula (3) below, or General Formula (4) below, or both (A2). The composition may further include other components.

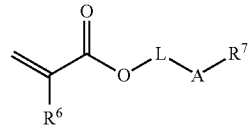

General Formula (3)

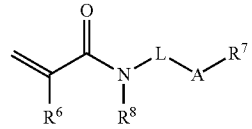

General Formula (4)

In General Formulae (3) and (4), L is a single bond or a straight chain or branched alkylene group that has from 1 through 10 carbon atoms and may include an oxygen atom, a nitrogen atom, or a sulfur atom; A is a cyclic structure that has from 2 through 10 carbon atoms and may include an oxygen atom, a nitrogen atom, or a sulfur atom; $R^6$ is a hydrogen atom or a methyl group; and $R^7$ and $R^8$ are each a straight chain or branched alkyl group having from 1 through 10 carbon atoms.

The present disclosure has an object to provide a composition having excellent curability and capable of forming a cured product having excellent adhesion to a base material.

The present disclosure can provide a composition having excellent curability and capable of forming a cured product having excellent adhesion to a base material.

The composition of the present disclosure has been accomplished based on the insights below. That is, a composition known in the related art may not have sufficient curability when an integrated light dose of irradiation energy of active energy rays is small (for example, the integrated light dose is 500 mJ/cm$^2$ or less).

Since the composition of the present disclosure includes an acrylamide compound having a molecular weight of 150 or greater but 250 or less (A1) and a monomer having a cyclic structure represented by General Formula (3), or General Formula (4), or both (A2), the composition has sufficient curability even when an integrated light dose of irradiation energy of active energy rays (particularly ultraviolet rays emitted from a LED used as a light source) is small (for example, the integrated light dose is 500 mJ/cm$^2$ or less), and can form a cured product having excellent adhesion to a base material, such as polyethylene terephthalate (PET) and polypropylene (PP).

The composition of the present disclosure is preferably a curable composition. Examples of the curable composition include a heat-curable composition and an active energy ray-curable composition. Among the above-listed examples, an active energy ray-curable composition is more preferable.

<Acrylamide Compound (A1)>

The acrylamide compound (A1) includes an acrylamide group and an ester structure and has a molecular weight of 150 or greater but 250 or less.

The molecular weight of the acrylamide compound (A1) is 150 or greater but 250 or less, and preferably 150 or greater but 200 or less. The molecular weight thereof being 150 or greater is preferable because odor generated by evaporation of the compound can be suppressed, and stability of inkjet ejection can be improved. The molecular weight thereof being 250 or less is preferable because curability of the composition becomes excellent, strength of a cured product improves, and moreover, viscosity of the composition is prevented from being too high.

In the present specification, (meth)acrylic acid ester means acrylic acid ester or methacrylic acid ester. (Meth)acrylate means acrylate or methacrylate.

The acrylamide compound (A1) is preferably a compound represented by General Formula (1), or General Formula (2), or both, more preferably a compound represented by General Formula (1) or General Formula (2), and even more preferably a compound represented by General Formula (1).

$$CH_2=CH-CO-N(R^1)-R^2-CO-O-R^3 \quad \text{General Formula (1)}$$

In General Formula (1), $R^1$ is a hydrogen atom or a straight chain or branched alkyl group having from 1 through 4 carbon atoms, and is preferably a straight chain or branched alkyl group having from 1 through 4 carbon atoms. Examples of $R^1$ include a methyl group, an ethyl group, a propyl group, an isopropyl group, a butyl group, a sec-butyl group, an isobutyl group, and a tert-butyl group.

In General Formula (1), $R^2$ is a straight chain or branched alkylene group having from 1 through 4 carbon atoms. Examples of $R^2$ include a methylene group, an ethane-1,1-diyl group, an ethane-1,2-diyl group, a propane-1,1-diyl group, a propane-1,2-diyl group, a propane-1,3-diyl group, a butane-1,1-diyl group, a butane-1,2-diyl group, a butane-1,3-diyl group, a butane-1,4-diyl group, a 2-methylpropane-1,1-diyl group, a 2-methylpropane-1,2-diyl group, and a 2-methylpropane-1,3-diyl group.

In General Formula (1), $R^3$ is a straight chain or branched alkyl group having from 1 through 4 carbon atoms. Examples of $R^3$ include a methyl group, an ethyl group, a propyl group, an isopropyl group, a butyl group, a sec-butyl group, an isobutyl group, and a tert-butyl group.

Note that, the total number of carbon atoms of $R^1$, $R^2$, and $R^3$ is from 2 through 6.

General Formula (2)

In General Formula (2), a ring X is a cyclic structure that includes a nitrogen atom and has from 2 through 5 carbon atoms. Examples of the ring X include aziridine, azetidine, pyrrolidine, and piperidine. Among the above-listed examples, pyrrolidine and piperidine are preferable.

In General Formula (2), $R^4$ is a single bond or a straight chain or branched alkylene group having from 1 through 3 carbon atoms. Examples of $R^4$ include a single bond, a methylene group, an ethane-1,1-diyl group, an ethane-1,2-diyl group, a propane-1,1-diyl group, a propane-1,2-diyl group, and a propane-1,3-diyl group.

In General Formula (2), $R^5$ is a straight chain or branched alkyl group having from 1 through 3 carbon atoms. Examples of $R^5$ include a methyl group, an ethyl group, a propyl group, and an isopropyl group.

Note that, the total amount of carbon atoms of the ring X, $R^4$, and $R^5$ is from 3 through 6.

As a compound represented by General Formula (1) or (2), for example, N-acryloyl-N-alkylamino acid alkyl ester (including N-acryloylproline alkyl ester), and N-acryloylpiperidine carboxylic acid alkyl ester are preferable. The alkyl group in this paragraph means a straight chain or branched alkyl group having from 1 through 4 carbon atoms, and is preferably an alkyl group having 1 or 2 carbon atoms (i.e., a methyl group or an ethyl group).

The N-acryloyl-N-alkylamino acid alkyl ester is not particularly limited and may be appropriately selected depending on the intended purpose. Examples thereof include N-acryloyl-N-methylglycine methyl ester, N-acryloyl-N-methylglycine ethyl ester, N-acryloyl-N-methylglycine propyl ester, N-acryloyl-N-methylglycine butyl ester, N-acryloyl-N-ethylglycine methyl ester, N-acryloyl-N-ethylglycine ethyl ester, N-acryloyl-N-ethylglycine propyl ester, N-acryloyl-N-propylglycine methyl ester, N-acryloyl-N-propylglycine ethyl ester, N-acryloyl-N-butylglycine methyl ester, N-acryloyl-N-methylalanine methyl ester, N-acryloyl-N-methylalanine ethyl ester, N-acryloyl-N-methylalanine propyl ester, N-acryloyl-N-ethylalanine methyl ester, N-acryloyl-N-ethylalanine ethyl ester, N-acryloyl-N-propylalanine methyl ester, N-acryloyl-N-methyl-β-alanine methyl ester, N-acryloyl-N-methyl-β-alanine ethyl ester, N-acryloyl-N-ethyl-β-alanine methyl ester, N-acryloyl-N-ethyl-β-alanine ethyl ester, N-acryloyl-N-methylvaline methyl ester, N-acryloylproline methyl ester, and N-acryloylproline ethyl ester. The above-listed examples may be used alone or in combination.

The N-acryloylpiperidine carboxylic acid alkyl ester is not particularly limited and may be appropriately selected depending on the intended purpose. Examples thereof include methyl N-acryloylpiperidine-2-carboxylate, methyl N-acryloylpipericline-3-carboxylate, and methyl N-acryloylpiperidine-4-carboxylate. The above-listed examples may be used alone or in combination.

In order to apply for an inkjet printing system, the acrylamide compound (A1) is preferably a colorless transparent or pale yellow transparent liquid having low viscosity (100 mPa·s or less) at room temperature (25° C.). For safety of users, moreover, the acrylamide compound (A1) is preferably a compound that does not exhibit strong acidity or basicity, and is free of harmful formaldehyde as impurities.

An amount of the acrylamide compound (A1) is preferably 20% by mass or greater but 98% by mass or less, more preferably 40% by mass or greater but 97% by mass or less, and further more preferably 64.8% by mass or greater but 96.8% by mass or less relative to a total amount of the composition.

<Monomer having a Cyclic Structure Represented by General Formula (3) or (4), or Both (A2)>

The monomer having a cyclic structure (A2) is a compound represented by General Formula (3) below, or General Formula (4) below, or both. The monomer having a cyclic structure (A2) is preferably a compound represented by General Formula (3) below or General Formula (4) below.

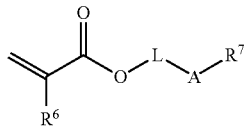

General Formula (3)

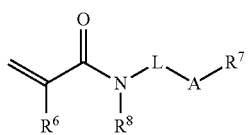

General Formula (4)

In General Formulae (3) and (4), L is a single bond or a straight chain or branched alkylene group that has from 1 through 10 carbon atoms and may include an oxygen atom, a nitrogen atom, or a sulfur atom.

Examples of the straight chain or branched alkylene group that has from 1 through 10 carbon atoms include a methylene group, an ethane-1,1-diyl group, an ethane-1,2-diyl group, a propane-1,1-diyl group, a propane-1,2-diyl group, and a propane-1,3-diyl group.

In General Formulae (3) and (4), A is a cyclic structure that has from 2 through 10 carbon atoms and may include an oxygen atom, a nitrogen atom, or a sulfur atom.

Examples of the cyclic structure that has from 2 through 10 carbon atoms include a cyclopentyl group, a cyclobutyl group, a cyclopentyl group, a cyclohexyl group, a cycloheptyl group, a cyclooctyl group, a cyclononyl group, a cyclodecyl group, an adamantyl group, a phenyl group, an aziridine group, an azetidine group, a pyrrolidine group, a piperidine group, thiophene, and furan.

In General Formulae (3) and (4), $R^6$ is a hydrogen atom or a methyl group.

In General Formulae (3) and (4), $R^7$ and $R^8$ are each a straight chain or branched alkyl group having from 1 through 10 carbon atoms.

Examples of the alkyl group having from 1 through 10 carbon atoms include a methyl group, an ethyl group, a propyl group, an isopropyl group, a n-butyl group, a s-butyl group, an isobutyl group, a t-butyl group, a pentyl group, a neopentyl group, a hexyl group, an isohexyl group, a heptyl group, an isoheptyl group, an octyl group, an isooctyl group, a nonyl group, an isononyl group, a decyl group, and an isodecyl group.

Examples of the monomer having a cyclic structure represented by General Formula (3) or (4) or both (A2) include (meth)acryloylmorpholine, isobornyl (meth)acrylate, tetrahydrofurfuryl (meth)acrylate, cyclohexyl (meth)acrylate, t-butylcyclohexyl (meth)acrylate, benzyl (meth)acrylate, 2-phenoxyethyl (meth)acrylate, phenoxy (meth)acrylate, N-vinylpyrrolidone, N-vinylcaprolactam, benzoxy (meth)acrylate, phenoxycliethylene glycol (meth)acrylate, 2-hydroxy-3-phenoxypropyl (meth)acrylate, neopentyl glycol-(meth)acrylic acid-benzoic acid ester, dicyclopentenyl (meth)acrylate, dicyclopentanyl (meth)acrylate, dicyclopentenyloxy (meth)acrylate, tetramethylpiperidinyl (meth)acrylate, and pentamethylpiperidinyl (meth)acrylate. The above-listed examples may be used alone or in combination.

Among the above-listed examples, (meth)acryloylmorpholine, isobornyl (meth)acrylate, tetrahydrofurfuryl (meth)acrylate, t-butylcyclohexyl (meth)acrylate, and cyclohexyl (meth)acrylate are preferable because curability can be enhanced without increasing viscosity.

An amount of the monomer having a cyclic structure represented by General Formula (3) or (4) or both (A2) is preferably 1% by mass or greater but 60% by mass or less, more preferably 5% by mass or greater but 40% by mass or less, and even more preferably 10% by mass or greater but 30% by mass or less, relative to a total amount of the composition.

When the amount of the monomer having a cyclic structure (A2) is 1% by mass or greater but 60% by mass or less, the resultant composition has sufficient curability even when an integrated light dose of irradiation energy of active energy rays is small, and can form a cured product having excellent adhesion to a base material, such as polyethylene terephthalate (PET), and polypropylene (PP).

<Other Polymerizable Compounds Excluding Acrylamide Compound (A1) and Monomer having Cyclic Structure Represented by General Formula (3) or (4) or Both (A2)>

As the above-mentioned other polymeric compounds, polymeric monomers know in the art, such as (meth)acrylic acid esters, can be used. Examples thereof include methyl (meth)acrylate, ethyl (meth)acrylate, n-butyl (meth) acrylate, allyl (meth)acrylate, glycidyl (meth)acrylate, 2-(dimethylamino)ethyl (meth)acrylate, 2-hydroxyethyl (meth) acrylate, 2-butoxyethyl (meth)acrylate, ethylcarbitol (meth) acrylate, 2-(2-vinyloxyethoxy)ethyl(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth) acrylate, tripropylene glycol di(meth)acrylate, tetrapropylene glycol di(meth)acrylate, polypropylene glycol di(meth) acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, and 1,9-nonanedliol di(meth)acrylate. The above-listed examples may be used alone or in combination.

Examples of other polymerizable compounds include: a urethane (meth)acrylate derivative obtained by reacting (meth)acrylic acid ester having a hydroxyl group with a compound having an isocyanate group; and an epoxy(meth) acrylate derivative obtained by reacting (meth)acrylic acid with a compound having an epoxy group.

Other than the derivatives of (meth)acrylic acid, moreover, N-vinyl compounds (e.g., N-vinylcaprolactam, N-vinylpyrrolidone, and N-vinylformamide), aromatic vinyl compounds (e.g., styrene, and α-methylstyrene), vinyl ethers (e.g., diethylene glycol divinyl ether, triethylene glycol divinyl ether, and cyclohexane dimethanol divinyl ether), and allyl compounds (e.g., allyl glycidyl ether, diallyl phthalate, and triallyl trimellitate.

Note that, the above-mentioned arylamide compound that does not include an ester structure is also used as the above-mentioned other polymerizable compounds.

An amount of the above-mentioned other polymerizable compounds excluding the acrylamide compound (A1) and the monomer having a cyclic structure represented by General Formula (3) or (4) or both (A2) is preferably 1% by mass or greater but 30% by mass or less, and more preferably 5% by mass or greater but 20% by mass or less, relative to a total amount of the composition.

<Polymerization Initiator (B)>

The composition of the present disclosure may include a polymerization initiator. Note that, the polymerization initiator may be simply referred to as an initiator. As the polymerization initiator, there are a heat polymerization initiator and a photopolymerization initiator.

The photopolymerization initiator is not particularly limited as long as the photopolymerization initiator is capable of generating active species, such as radicals and cations, and inducing polymerization of a polymerizable compound (e.g., a monomer and an oligomer). As the photopolymerization initiator, any of radical polymerization initiators, cation polymerization initiators, base generators, etc., can be used alone or in combination. Among the above-listed examples, a radical polymerization initiator is preferable. Examples of the radical polymerization initiator include aromatic ketones, acylphosphine oxide compounds, aromatic onium salt compounds, organic peroxides, thio compounds (e.g., thioxanthone compounds and thiophenyl group-containing compounds), hexaarylbiimidazole compounds, ketoxime ester compounds, borate compounds, actinium compounds, metallocene compounds, active ester compounds, compounds including a carbon-halogen bond, and alkylamine compounds.

The radical polymerization initiator is not particularly limited and may be appropriately selected depending on the intended purpose. Examples thereof include polyethylene glycol 200-di(6-4(4-(2-dimethylamino-2-benzyl)butanonylphenyl)piperazine) (Omnipol 910, available from IGM), 1,3-di({α-[1-chloro-9-oxo-9H-thioxanthen-4-yl)oxy]
  acetylpoly[oxy(1-methyl ethylene)]}oxy)-2,2-bis({α-[1-chloro-9-oxo-9H-thioxanthen-4-yl)oxy]acetylp oly[oxy (1-methylethylene)]}oxymethyl)propane
  (Speedcure7010, available from Lambson), a mixture of 1,3-di({α-4-(dimethylamino)benzoylpoly[oxy(1-methylethylene)]}oxy)-2,2-b is ({α-4-(dimethylamino)benzoylpoly [oxy(1-methylethylene)]}oxymethyl)propane and {α-4-(dimethylamino)benzoylpoly(oxyethylene)-poly[oxy (1-methylethylene)]-poly(oxyethylene)}4-(dimethylamino)benzoate (Speedcure7040, available from Lambson), polybutylene glycol
bis(9-oxo-9H-thioxanthinyloxy)acetate (Omnipol TX, available from IGM), a polymeric thioxanthene compound (Genepol TX-2, available from Lahn AG), and an oligomer of
2-hydroxy-1-(4-isopropenylphenyl)-2-methylpropan-1-one (Esacure ONE, available from IGM). The above-listed examples may be used alone or in combination.

In order to obtain sufficient curing speed, an amount of the polymerization initiator is preferably 1% by mass or greater but 20% by mass or less, more preferably 3% by mass or greater but 15% by mass or less, and even more preferably 5% by mass or greater but 10% by mass or less relative to a total amount of the composition.

In addition to the polymerization initiator, a polymerization accelerator (sensitizer) may be used in combination. The polymerization accelerator is not particularly limited and may be appropriately selected depending on the intended purpose. Examples of the polymerization accelerator include amine compounds, such as trimethyl amine, methyl dimethanol amine, triethanol amine, p-diethylaminoacetophenone, ethyl p-dimethylaminobenzoate, 2-ethylhexyl-p-dimethylaminobenzoate, and N,N-dimethylbenzylamine-4,4'-bis(diethylamino)benzophenone.

An amount of the polymerization accelerator is not particularly limited and may be appropriately set depending on a polymerization initiator for use or an amount of the polymerization initiator.

<Coloring Material>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof.

A content of the colorant in the composition is not particularly limited, and may be appropriately determined considering, for example, a desired color density and dispersibility of the colorant in the composition. However, it is preferably from 0.1% by mass to 20% by mass relative to the total mass of the composition. Incidentally, the composition of the present disclosure does not necessarily contain a colorant but can be clear and colorless. In such a case, for example, such a clear and colorless composition is good for an overcoating layer to protect an image.

The pigments include inorganic pigments and organic pigments. These can be used alone or in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The composition of the present disclosure optionally contains other known components. The other known components are not particularly limited. Specific examples thereof include, but are not limited to, surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

Note that, each component in the composition can be analyzed as follows. Low molecular weight components, such as a monomer and an initiator, can be determined by gas chromatography mass spectrometry. A principle skeleton of a polymer component or an amount of chlorine atoms therein can be determined by infrared spectroscopy or elemental analysis by precipitating and separating the polymer component using a poor solvent, such as methanol.

<Preparation of Composition>

The composition of the present disclosure can be prepared by using the components described above. The preparation devices and conditions are not particularly limited. For example, the composition can be prepared by subjecting the acrylamide compound (A1) having a molecular weight of 150 or greater but 250 or less, the monomer having a cyclic structure represented by General Formula (3) or (4) or both (A2), a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the curable composition of the present disclosure has no particular limit because it can be adjusted depending on the purpose and application devices. For example, if an ejecting device is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above.

Incidentally, the viscosity can be measured by a cone plate rotary viscometer (VISCOMETER TVE-22L, manufactured by TOKI SANGYO CO., LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Curing Unit>

Examples of a curing unit configured to cure the composition of the present disclosure include a curing unit configured to cure through heat curing or irradiation with active energy rays. Among them, curing is preferably performed by irradiation with active energy rays.

Specific examples of the active energy ray for curing the curable composition include, but are not limited to, electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

Among the above-listed examples, ultraviolet rays having a peak in the wavelength range of 285 nm or longer but 405 nm or shorter (preferably 365 nm or longer but 405 nm or shorter) emitted from a UV ray emitting diode (may be also referred to as UV-LED hereinafter) are preferable in view of energy saving and downsizing of a device. Note that, a light absorption spectrum of the polymerization initiator is typically broad. Use of UV-LED emitting a very narrow certain wavelength range make improvement of curability of the composition difficult. Therefore, use of the composition of the present disclosure, which has excellent curability even with UV-LED, is preferable.

<Application Field>

The application field of the composition of the present disclosure is not particularly limited. It can be applied to any field where active energy ray curable compositions are used. For example, the composition is selected to a particular application and used for a resin for processing, a paint, an adhesive, an insulant, a releasing agent, a coating material, a sealing material, various resists, and various optical materials.

Figure 2:
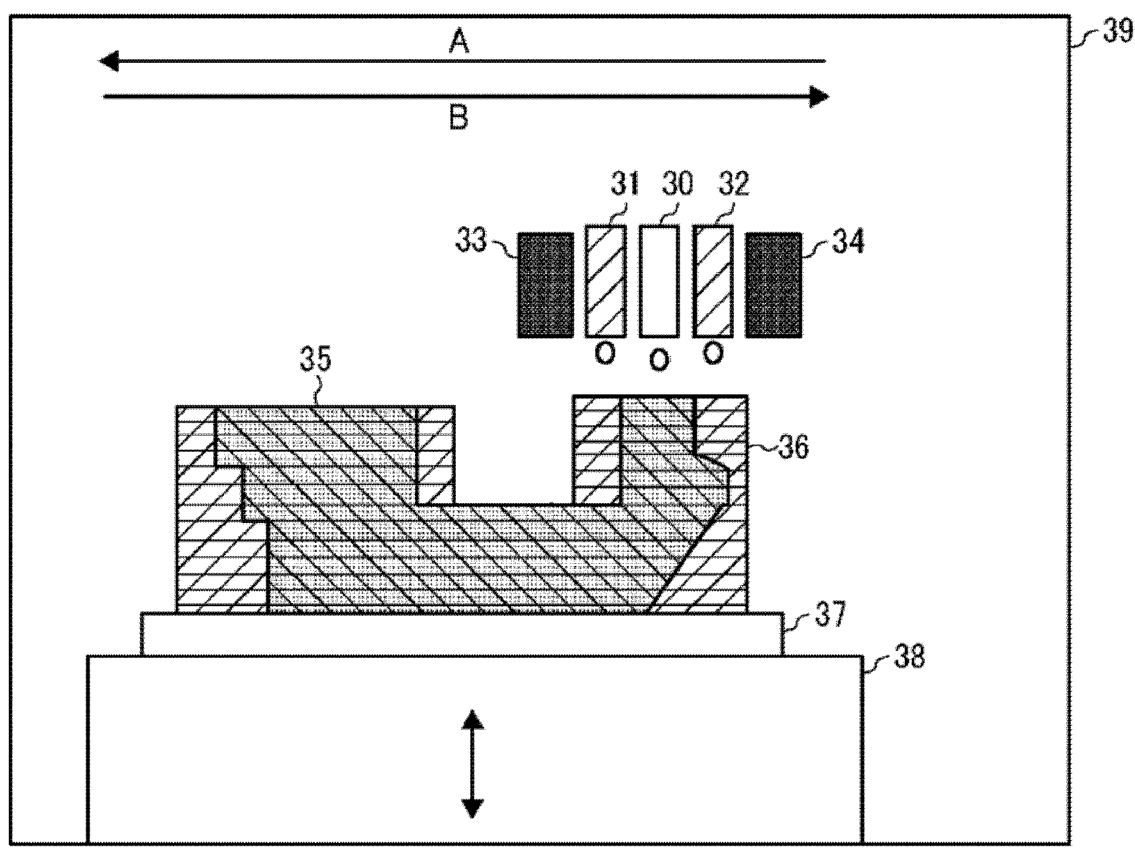
FIG. 2 is a schematic view illustrating an example of another image forming apparatus (apparatus for forming 3D object)
Figure 3:
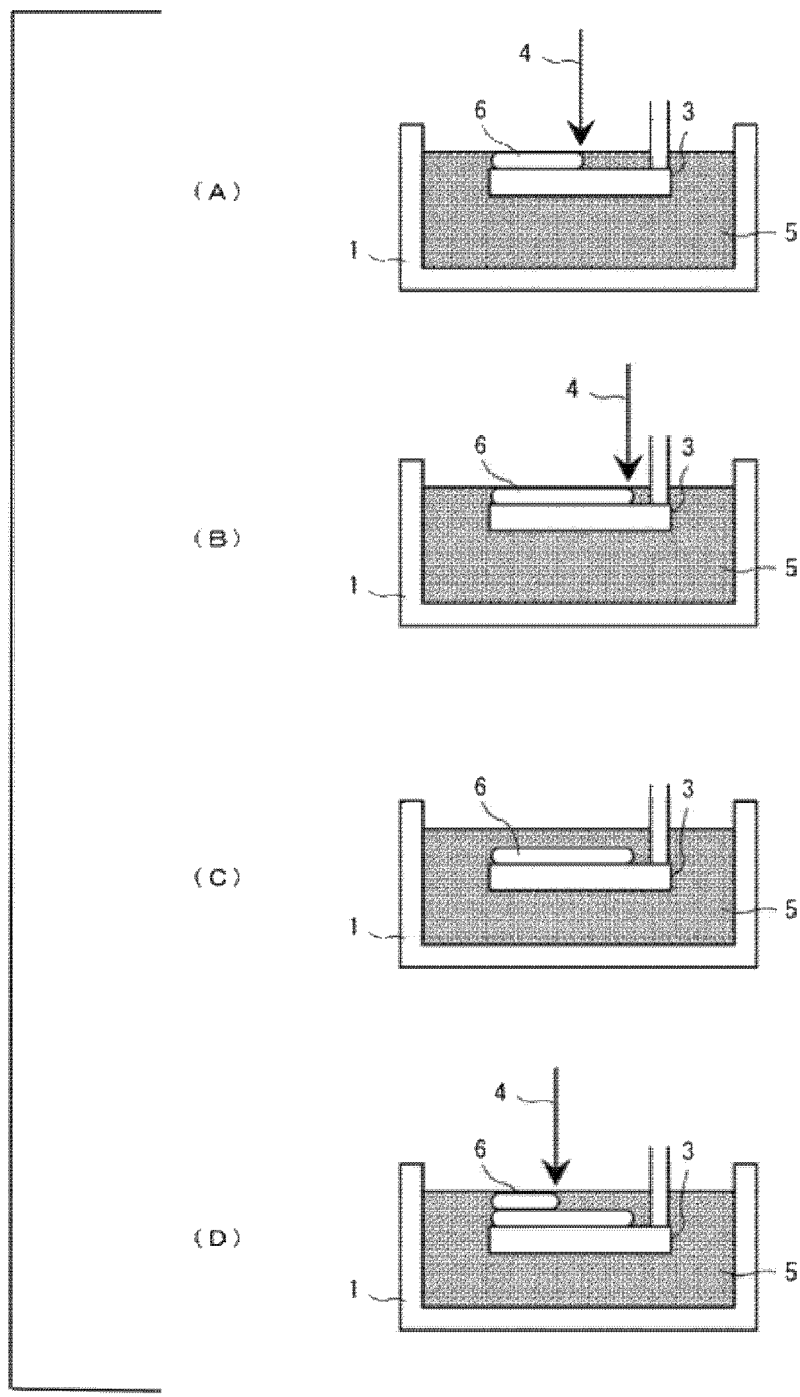
FIG. 3 is a schematic view for illustrating an example of a method for performing three-dimensional object formation using a composition.

Furthermore, the curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, and FIG. 3. FIG. 2 is a diagram illustrating a method of additive manufacturing to sequentially form layers of the curable composition of the present disclosure one on top of the other by repeating discharging the curable composition to particular areas followed by curing upon irradiation of an active energy ray. FIG. 3 is a diagram illustrating a method of additive manufacturing to sequentially form cured layers 6 having respective predetermined forms one on top of the other on a movable stage 3 by irradiating a storing pool (storing part) 1 of the composition 5 of the present disclosure with the active energy ray 4.

An apparatus for fabricating a three-dimensional object by the composition of the present disclosure is not particularly limited and can be a known apparatus. For example, the apparatus includes a containing device, a supplying device, and a discharging device of the composition, and an active energy ray irradiator.

In addition, the present disclosure includes cured materials obtained by curing the curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<<Storage Container>>

The storage container of the present disclosure contains the curable composition and is suitable for the applications as described above. For example, if the curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<<Image Forming Method and Image Forming Apparatus>>

The image forming method of the present disclosure may use active energy rays or heating. In order to cure the composition of the present disclosure with active energy rays, the image forming method includes an irradiating step including applying active energy rays, and the image forming apparatus of the present disclosure includes an irradiation unit configured to apply active energy rays, and a container configured to store therein the composition of the present disclosure. The container may store the container described above. Moreover, the image forming method and image forming apparatus may further include an ejection step and an ejection unit configured to eject the composition of the present disclosure, respectively. A method for ejecting the composition is not particularly limited. Examples thereof include continuous jet and on-demand ejection. Examples of the on-demand ejection include a piezo system, a thermal system, and an electrostatic system.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or composite materials thereof, each of which may be in the form of a sheet. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 9 illustrated in FIG. 2 sequentially forms thin layers one on top of the other using a head unit having inkjet heads arranged movable in the directions indicated by the arrows A and B. In the image forming apparatus 9, an ejection head unit 30 for forming ejects a first composition, and ejection head units 31 and 32 for a support ejects a second composition having a different composition from the first composition, while ultraviolet irradiators 33 and 34 adjacent to the ejection head units 31 and 32 cure the compositions. To be more specific, for example, after the ejection head units 31 and 32 for a support eject the second composition onto a substrate 37 for forming and the second composition is solidified by irradiation of an active energy ray to form a first substrate having a space for a composition, the ejection head unit 30 for forming ejects the first composition onto the pool followed by irradiation of an active energy ray for solidification, thereby forming a first formed layer. This step is repeated multiple times lowering the stage 38 movable in the vertical direction to laminate the support layer and the formed layers to fabricate a solid object 35. Thereafter, the laminated support part 36 is removed, if desired. Although only a single ejection head unit 30 for forming is provided to the image forming apparatus 39 illustrated in FIG. 2, it can have two or more units 30.

EXAMPLES

The present disclosure will be described more specifically below by way of Examples. The present disclosure should not be construed as being limited to these Examples.

<Constitutional Components of Composition>

Abbreviations, compound names, manufacturers' names, and product names of raw materials used for preparing compositions are presented in Tables 1-1 and 1-3.

Raw materials that were not commercially available were synthesized according to the methods described in Synthesis Examples 1 to 10. The identification of the synthesized compound was performed by nuclear magnetic resonance spectroscopy (device for use: JNM-ECX500, available from JEOL Ltd.,), and the measurement of the purity was performed by gas chromatography (device for use: GCMS-QP2010 Plus, available from Shimadzu Corporation). The above-mentioned chemical analysis methods were performed by conventional methods.

TABLE 1-1

| | Abbreviation | Compound name or structure | Manufacturer's name and product name |
|---|---|---|---|
| Acrylamide compound having molecular weight of 150 to 250 and ester structure (A1-1) | A1-1-1 | (structure) | (see Synthesis Example 1) |
| | A1-1-2 | (structure) | (see Synthesis Example 2) |
| | A1-1-3 | (structure) | (see Synthesis Example 3) |
| | A1-1-4 | (structure) | (see Synthesis Example 4) |
| | A1-1-5 | (structure) | (see Synthesis Example 5) |
| | A1-1-6 | (structure) | (see Synthesis Example 6) |
| | A1-1-7 | (structure) | (see Synthesis Example 7) |
| | A1-1-8 | (structure) | (see Synthesis Example 10) |
| Acrylamide compound (A1-2) excluding (A-1) | A1-2-1 | (structure) | (see Synthesis Example 8) |
| | A1-2-2 | (structure) | (see Synthesis Example 9) |

TABLE 1-2

| | | Structure | Name/Source |
|---|---|---|---|
| Polymerizable compound having cyclic structure (A2) | A2-1 | | Acryloyl morpholine, from KJ Chemicals Corporation |
| | A2-2 | | Isobornyl acrylate, from OSAKA ORGANIC CHEMICAL INDUSTRY LTD. |
| | A2-3 | | Biscoat 150, from OSAKA ORGANIC CHEMICAL INDUSTRY LTD. |
| | A2-4 | | Cyclohexyl acrylate, from OSAKA ORGANIC CHEMICAL INDUSTRY LTD. |
| | A2-5 | | t-butylcyclohexyl acrylate, from KJ Chemicals Corporation |
| | A2-6 | | N-vinylpyrrolidone, from Tokyo Chemical Industry Co., Ltd. |
| | A2-7 | $\text{—OCH}_2\text{CH}_2\text{OCC(CH}_3\text{)}=\text{CH}_2$ with carbonyl | Dicyclopentenyloxyethyl acrylate, from Hitachi Chemical Company, Ltd. |
| | A2-8 | $H_2C=C(CH_3)-C(=O)-O-$ (pentamethylpiperidinyl) | Pentamethypiperidinyl methacrylate, available from Hitachi Chemical Company, Ltd. |
| Polymerizable compound having no cyclic structure (A3) | A3-1 | | Methyl acrylate, available from Tokyo Chemical Industry Co., Ltd. |
| | A3-2 | | Vinylethoxyethoxyethyl acrylate, available from NIPPON SHOKUBAI CO., LTD. |

TABLE 1-3

| | Abbreviation | Name or structure of compound | Product name and manufacturer's name |
|---|---|---|---|
| Polymerization initiator (B) | B-1 | 1,3-di({α-[1-chloro-9-oxo-9H-thioxanthen-4-yl)oxy]acetylpoly[oxy(1-methylethylene)]}oxy)-2,2-bis({α-[1-chloro-9-oxo-9H-thioxanthen-4-yl)oxy]acetylpoly[oxy(1-methylethylene)]}oxy methyl)propane | Speedcure 7010 available from Lmbson |

TABLE 1-3-continued

| | Abbreviation | Name or structure of compound | Product name and manufacturer's name |
|---|---|---|---|
| | B-2 | mixture of 1,3-di({α-4-(dimethylamino)benzoylpoly[oxy(1-methylethylene)]}oxy)-2,2-bis({α-4-(dimethylamino)benzoylpoly[oxy(1-methylethylene)]}oxymethyl)propane and {α-4-(dimethylamino)benzoylpoly(oxyethylene)-poly[oxy(1-methylethylene)]-poly(oxyethylene)}4-(dimethylamino)benzoate | Speedcure 7040 available from Lmbson |
| | B-3 | oligomer of 2-hydroxy-1-(4-isopropenylphenyl)-2-methylpropan-1-one | Esacure ONE available from IGM |
| | B-4 | 1-hydroxy-cyclohexyl-phenylketone | Irgacure 184 available from BASF Japan |
| | B-5 | 2-(dimethylamino)-2-[(4-methylphenyl)methyl]-1-[4-(4-morpholinyl)phenyl]-1-butanone | Irgacure 379 available from BASF Japan |
| | B-6 | bis(2,4,6-trimethylbenzoyl)phenylphosphine oxide | Irgacure 819 available from BASF Japan |
| | B-7 | 2-[4-(methylthio)benzoyl]-2-(4-morpholinyl)propane | Irgacure 907 available from BASF Japan |
| | B-8 | 2,4,6-trimethylbenzoyl-diphenyl-phosphine oxide | Irgacure TPO available from BASF Japan |
| Other components | Polymerization Inhibitor | 4-methoxyphenol | METHOQUINONE available from Seiko Chemical Co., Ltd. |
| | Surfactant | silicone-based surfactant | BYK-UV3510 available from BYK Japan KK |

Synthesis Example 1

<Synthesis of N-acryloyl-N-methylglycine Methyl Ester (A1-1)>

N-methylglycine methyl ester hydrochloride (reagent, available from Sigma-Aldrich Co., LLC.) in an amount of 0.30 mol, 0.45 mol of potassium carbonate (reagent, available from KANTO CHEMICAL CO., INC.), and 400 mL of water were stirred and mixed at a temperature of from 0° C. through 10° C. With maintaining the temperature, 0.33 mol of acrylic acid chloride (reagent, available from Wako Pure Chemical Industries, Ltd.) was slowly dripped. After completing the dripping, extraction was performed 3 times with 400 mL of ethyl acetate (reagent, available from KANTO CHEMICAL CO., INC.), and the resultant ethyl acetate layers were combined and washed with 400 mL of water once. The ethyl acetate was removed under the reduced pressure at 40° C., to thereby obtain 0.20 mol of targeted N-acryloyl-N-methylglycine methyl ester (A1-1) as a substantially colorless transparent liquid. The purity thereof was 98.3% by mass.

Note that, a molecular weight of N-acryloyl-N-methylglycine methyl ester (A1-1) was 157.2. N-acryloyl-N-methylglycine methyl ester (A1-1) is a known compound (CAS registry number: 72065-23-7).

Synthesis Example 2

<Synthesis of N-acryloyl-N-isopropylglycine Isopropyl Ester (A1-2)>

Targeted N-acryloyl-N-isopropylglycine isopropyl ester (A1-2) (0.22 mol) was obtained as a substantially colorless transparent liquid in the same manner as in Synthesis Example 1, except that N-methylglycine methyl ester hydrochloride was replaced with N-isopropylglycine isopropyl ester hydrochloride (reagent, available from Tokyo Chemical Industry Co., Ltd.). The purity thereof was 98.5% by mass.

Note that, a molecular weight of N-acryloyl-N-isopropylglycine isopropyl ester (A1-2) was 213.3.

Synthesis Example 3

<Synthesis of N-acryloyl-N-isopropylglycine Methyl Ester (A1-3)>

Targeted N-acryloyl-N-isopropylglycine methyl ester (A1-3) (0.22 mol) was obtained as a substantially colorless transparent liquid in the same manner as in Synthesis Example 1, except that N-methylglycine methyl ester hydrochloride was replaced with N-isopropylglycine methyl ester hydrochloride (reagent, available from Tokyo Chemical Industry Co., Ltd.). The purity thereof was 98.5% by mass.

Note that, a molecular weight of N-acryloyl-N-isopropylglycine methyl ester (A1-3) was 185.2.

Synthesis Example 4

<Synthesis of N-acryloyl-N-methylalanine methyl Ester (A1-4)>

Targeted N-acryloyl-N-methylalanine methyl ester (A1-4) (0.22 mol) was obtained as a substantially colorless transparent liquid in the same manner as in Synthesis Example 1, except that N-methylglycine methyl ester hydrochloride was replaced with N-methylalanine methyl ester hydrochloride (reagent, available from Tokyo Chemical Industry Co., Ltd.). The purities thereof was 98.5% by mass.

Note that, a molecular weight of N-acryloyl-N-methylalanine methyl ester (A1-4) was 171.2.

Synthesis Example 5

<Synthesis of N-acryloyl-N-methylglycine Isopropyl Ester (A1-5)>

Targeted N-acryloyl-N-methylglycine isopropyl ester (A1-5) (0.22 mol) was obtained as a substantially colorless transparent liquid in the same manner as in Synthesis Example 1, except that N-methylglycine methyl ester hydrochloride was replaced with N-methylglycine isopropyl ester hydrochloride (reagent, available from Tokyo Chemical Industry Co., Ltd.). The purity thereof was 98.5% by mass.

Note that, a molecular weight of N-acryloyl-N-methylglycine isopropyl ester (A1-5) was 185.2.

Synthesis Example 6

<Synthesis of N-acryloyl-N-methylalanine Isopropyl Ester (A1-6)>

Targeted N-acryloyl-N-methylalanine isopropyl ester (A1-6) (0.22 mol) was obtained as a substantially colorless transparent liquid in the same manner as in Synthesis Example 1, except that N-methylglycine methyl ester hydrochloride was replaced with N-methylalanine isopropyl ester hydrochloride (reagent, available from Tokyo Chemical Industry Co., Ltd.). The purity thereof was 98.5% by mass.

Note that, a molecular weight of N-acryloyl-N-methylalanine isopropyl ester (A1-6) was 199.3.

Synthesis Example 7

<Synthesis of Ethyl N-acryloylpiperidine-4-carboxylate (A1-7)>

Targeted ethyl N-acryloylpiperidine-4-carboxylate (A1-7) (0.27 mol) was obtained as a substantially colorless transparent liquid in the same manner as in Synthesis Example 1, except that N-methylglycine methyl ester hydrochloride was replaced with ethyl piperidine-4-carboxylate hydrochloride (reagent, available from Tokyo Chemical Industry Co., Ltd.). The purity thereof was 99.2% by mass.

Note that, a molecular weight of ethyl N-acryloylpiperidine-4-carboxylate (A1-7) was 211.3. Ethyl N-acryloylpiperidine-4-carboxylate (A1-7) is a known compound (CAS registry number: 845907-79-1).

Synthesis Example 8

<Synthesis of N-acryloylalanine Methyl Ester (A1-2-1)>

Targeted N-acryloylalanine methyl ester (A1-2-1) (0.21 mol) was obtained as a substantially colorless transparent liquid in the same manner as in Synthesis Example 1, except that N-glycine methyl ester hydrochloride was replaced with alanine methyl ester hydrochloride (reagent, available from Tokyo Chemical Industry Co., Ltd.). The purity was 99.5% by mass.

Note that, a molecular weight of N-acryloylalanine methyl ester (A1-2-1) was 143.1.

Synthesis Example 9

<Synthesis of N-acryloyl N-pentylalanine Pentyl Ester (A1-2-2)>

Targeted N-acryloyl N-pentylalanine pentyl ester (A1-2-2) (0.20 mol) was obtained as a substantially colorless transparent liquid in the same manner as in Synthesis Example 1, except that N-glycine methyl ester hydrochloride was replaced with N-pentylalanine pentyl ester hydrochloride (reagent, available from Tokyo Chemical Industry Co., Ltd.). The purity thereof was 99.5% by mass.

Note that, a molecular weight of N-acryloyl N-pentylalanine pentyl ester (A1-2-2) was 269.4.

Synthesis Example 10

<Synthesis of N-acryloyl-N-methylglycine n-butyl ester (A1-1-8)>

Targeted N-acryloyl-N-methylglycine n-butyl ester (A1-1-8) (0.20 mol) was obtained as substantially colorless transparent liquid in the same manner as in Synthesis Example 1, except that N-glycine methyl ester hydrochloride was replaced with N-methylglycine n-butyl ester hydrochloride (reagent, available from Tokyo Chemical Industry Co., Ltd.). The purity thereof was 99.5% by mass.

Note that, a molecular weight of N-acryloyl-N-methylglycine n-butyl ester (A1-1-8) was 199.3.

Example 1

<Production of Composition>

A composition of Example 1 was produced by adding 83.8% by mass of A1-1-1, 10.0% by mass of A2-1, 3.0% by mass of B-1, 3.0% by mass of B-2, 0.1% by mass of a polymerization inhibitor, and 0.1% by mass of a surfactant in this order, stirring the resultant mixture for 2 hours, and visually confirming that there was no undissolved component remained, followed by removing coarse particles through filtration with a membrane filter.

Examples 2 to 40 and Comparative Examples 1 to 16

Compositions of Examples 2 to 40 and Comparative Examples 1 to 16 were each produced in the same manner as in Example 1, except that the composition and the amounts (% by mass) were changed as presented in Tables 2 to 7 below.

TABLE 2

|        | Example |      |      |      |      |      |      |      |      |      |
|--------|------|------|------|------|------|------|------|------|------|------|
|        | 1    | 2    | 3    | 4    | 5    | 6    | 7    | 8    | 9    | 10   |
| A1-1-1 | 83.8 |      |      |      |      |      |      | 58.0 | 58.0 | 58.0 |
| A1-1-2 |      | 83.8 |      |      |      |      |      |      |      |      |
| A1-1-3 |      |      | 83.8 |      |      |      |      |      |      |      |
| A1-1-4 |      |      |      | 83.8 |      |      |      |      |      |      |
| A1-1-5 |      |      |      |      | 83.8 |      |      |      |      |      |
| A1-1-6 |      |      |      |      |      | 83.8 |      |      |      |      |
| A1-1-7 |      |      |      |      |      |      | 83.8 |      |      |      |
| A1-1-8 |      |      |      |      |      |      |      |      |      |      |
| A1-2-1 |      |      |      |      |      |      |      |      |      |      |
| A1-2-2 |      |      |      |      |      |      |      |      |      |      |
| A2-1   | 10.0 | 10.0 | 10.0 | 10.0 | 10.0 | 10.0 | 10.0 | 35.8 |      |      |
| A2-2   |      |      |      |      |      |      |      |      | 35.8 |      |
| A2-3   |      |      |      |      |      |      |      |      |      | 35.8 |
| A2-4   |      |      |      |      |      |      |      |      |      |      |
| A2-5   |      |      |      |      |      |      |      |      |      |      |
| A2-6   |      |      |      |      |      |      |      |      |      |      |
| A2-7   |      |      |      |      |      |      |      |      |      |      |
| A2-8   |      |      |      |      |      |      |      |      |      |      |
| A3-1   |      |      |      |      |      |      |      |      |      |      |

TABLE 2-continued

|  | Example | | | | | | | | | |
|---|---|---|---|---|---|---|---|---|---|---|
|  | 1 | 2 | 3 | 4 | 5 | 6 | 7 | 8 | 9 | 10 |
| A3-2 | | | | | | | | | | |
| B-1 | 3.0 | 3.0 | 3.0 | 3.0 | 3.0 | 3.0 | 3.0 | 3.0 | 3.0 | 3.0 |
| B-2 | 3.0 | 3.0 | 3.0 | 3.0 | 3.0 | 3.0 | 3.0 | 3.0 | 3.0 | 3.0 |
| B-3 | | | | | | | | | | |
| B-4 | | | | | | | | | | |
| B-5 | | | | | | | | | | |
| B-6 | | | | | | | | | | |
| B-7 | | | | | | | | | | |
| B-8 | | | | | | | | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total (mass %) | 100.0 | 100.0 | 100.0 | 100.0 | 100.0 | 100.0 | 100.0 | 100.0 | 100.0 | 100.0 |

TABLE 3

|  | Example | | | | | | | | | |
|---|---|---|---|---|---|---|---|---|---|---|
|  | 11 | 12 | 13 | 14 | 15 | 16 | 17 | 18 | 19 | 20 |
| A1-1-1 | 58.0 | 58.0 | 84.8 | 84.8 | 84.8 | 84.8 | 84.8 | 59.0 | 59.0 | 59.0 |
| A1-1-2 | | | | | | | | | | |
| A1-1-3 | | | | | | | | | | |
| A1-1-4 | | | | | | | | | | |
| A1-1-5 | | | | | | | | | | |
| A1-1-6 | | | | | | | | | | |
| A1-1-7 | | | | | | | | | | |
| A1-1-8 | | | | | | | | | | |
| A1-2-1 | | | | | | | | | | |
| A1-2-2 | | | | | | | | | | |
| A2-1 | | | 10.0 | | | | | 35.8 | | |
| A2-2 | | | | 10.0 | | | | | 35.8 | |
| A2-3 | | | | | 10.0 | | | | | 35.8 |
| A2-4 | 35.8 | | | | | 10.0 | | | | |
| A2-5 | | 35.8 | | | | | 10.0 | | | |
| A2-6 | | | | | | | | | | |
| A2-7 | | | | | | | | | | |
| A2-8 | | | | | | | | | | |
| A3-1 | | | | | | | | | | |
| A3-2 | | | | | | | | | | |
| B-1 | 3.0 | 3.0 | | | | | | | | |
| B-2 | 3.0 | 3.0 | 2.0 | 2.0 | 2.0 | 2.0 | 2.0 | 2.0 | 2.0 | 2.0 |
| B-3 | | | 3.0 | 3.0 | 3.0 | 3.0 | 3.0 | 3.0 | 3.0 | 3.0 |
| B-4 | | | | | | | | | | |
| B-5 | | | | | | | | | | |
| B-6 | | | | | | | | | | |
| B-7 | | | | | | | | | | |
| B-8 | | | | | | | | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total (mass %) | 100.0 | 100.0 | 100.0 | 100.0 | 100.0 | 100.0 | 100.0 | 100.0 | 100.0 | 100.0 |

TABLE 4

|  | Example | | | | | | | | | |
|---|---|---|---|---|---|---|---|---|---|---|
|  | 21 | 22 | 23 | 24 | 25 | 26 | 27 | 28 | 29 | 30 |
| A1-1-1 | 84.8 | 74.8 | 64.8 | 54.8 | 84.8 | 84.8 | 90.8 | 82.8 | 82.8 | 82.8 |
| A1-1-2 | | | | | | | | | | |
| A1-1-3 | | | | | | | | | | |
| A1-1-4 | | | | | | | | | | |
| A1-1-5 | | | | | | | | | | |
| A1-1-6 | | | | | | | | | | |

TABLE 4-continued

|  | Example | | | | | | | | | |
|---|---|---|---|---|---|---|---|---|---|---|
|  | 21 | 22 | 23 | 24 | 25 | 26 | 27 | 28 | 29 | 30 |
| A1-1-7 | | | | | | | | | | |
| A1-1-8 | | | | | | | | | | |
| A1-2-1 | | | | | | | | | | |
| A1-2-2 | | | | | | | | | | |
| A2-1 | 10.0 | 20.0 | 30.0 | 40.0 | | | | | | |
| A2-2 | | | | | | | | 9.0 | | |
| A2-3 | | | | | | | | | | |
| A2-4 | | | | | | | | | | |
| A2-5 | | | | | 10.0 | 10.0 | | | 9.0 | 9.0 |
| A2-6 | | | | | | | | | | |
| A2-7 | | | | | | | | | | |
| A2-8 | | | | | | | | | | |
| A3-1 | | | | | | | | | | |
| A3-2 | | | | | | | | | | |
| B-1 | | | | | | | | 4.0 | 4.0 | |
| B-2 | | | | | | | | 4.0 | 4.0 | |
| B-3 | 5.0 | | | | | | 9.0 | | | 8.0 |
| B-4 | | 5.0 | | | | | | | | |
| B-5 | | | 5.0 | | | | | | | |
| B-6 | | | | 5.0 | | | | | | |
| B-7 | | | | | 5.0 | | | | | |
| B-8 | | | | | | 5.0 | | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total (mass %) | 100.0 | 100.0 | 100.0 | 100.0 | 100.0 | 100.0 | 100.0 | 100.0 | 100.0 | 100.0 |

TABLE 5

|  | Example | | | | | | | | | |
|---|---|---|---|---|---|---|---|---|---|---|
|  | 31 | 32 | 33 | 34 | 35 | 36 | 37 | 38 | 39 | 40 |
| A1-1-1 | | | | | 84.8 | 84.8 | 84.8 | 91.8 | 89.8 | 53.8 |
| A1-1-2 | | | | | | | | | | |
| A1-1-3 | | | | | | | | | | |
| A1-1-4 | | | | | | | | | | |
| A1-1-5 | | | | | | | | | | |
| A1-1-6 | | | | | | | | | | |
| A1-1-7 | | | | | | | | | | |
| A1-1-8 | 58.0 | 58.0 | 84.8 | 84.8 | | | | | | |
| A1-2-1 | | | | | | | | | | |
| A1-2-2 | | | | | | | | | | |
| A2-1 | | | 10.0 | | | | | 3.0 | 5.0 | 41.0 |
| A2-2 | | | | 10.0 | | | | | | |
| A2-3 | | | | | | | | | | |
| A2-4 | 35.8 | | | | | | | | | |
| A2-5 | | 35.8 | | | | | | | | |
| A2-6 | | | | | 10.0 | | | | | |
| A2-7 | | | | | | 10.0 | | | | |
| A2-8 | | | | | | | 10.0 | | | |
| A3-1 | | | | | | | | | | |
| A3-2 | | | | | | | | | | |
| B-1 | 3.0 | 3.0 | | | | | 2.0 | 2.0 | 2.0 | 2.0 |
| B-2 | 3.0 | 3.0 | 2.0 | 2.0 | 2.0 | 2.0 | 3.0 | 3.0 | 3.0 | 3.0 |
| B-3 | | | 3.0 | 3.0 | 3.0 | 3.0 | | | | |
| B-4 | | | | | | | | | | |
| B-5 | | | | | | | | | | |
| B-6 | | | | | | | | | | |
| B-7 | | | | | | | | | | |
| B-8 | | | | | | | | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total (mass %) | 100.0 | 100.0 | 100.0 | 100.0 | 100.0 | 100.0 | 100.0 | 100.0 | 100.0 | 100.0 |

TABLE 6

| | Comparative Example | | | | | | | | | |
|---|---|---|---|---|---|---|---|---|---|---|
| | 1 | 2 | 3 | 4 | 5 | 6 | 7 | 8 | 9 | 10 |
| A1-1-1 | | | | | | | | | | |
| A1-1-2 | | | | | | | | | | |
| A1-1-3 | | | | | | | | | | |
| A1-1-4 | | | | | | | | | | |
| A1-1-5 | | | | | | | | | | |
| A1-1-6 | | | | | | | | | | |
| A1-1-7 | | | | | | | | | | |
| A1-1-8 | | | | | | | | | | |
| A1-2-1 | | | | | | | | | | |
| A1-2-2 | | | | | | | | | | |
| A2-1 | 94.8 | | | | | | | | | 93.8 |
| A2-2 | | 94.8 | | | | 94.8 | | | | |
| A2-3 | | | 94.8 | | | | 94.8 | | | |
| A2-4 | | | | 94.8 | | | | 94.8 | | |
| A2-5 | | | | | 94.8 | | | | 94.8 | |
| A2-6 | | | | | | | | | | |
| A2-7 | | | | | | | | | | |
| A2-8 | | | | | | | | | | |
| A3-1 | | | | | | | | | | |
| A3-2 | | | | | | | | | | |
| B-1 | 5.0 | | 3.0 | | | | | | | 3.0 |
| B-2 | | 5.0 | 2.0 | | | | | | | 3.0 |
| B-3 | | | | 5.0 | | | | | | |
| B-4 | | | | | 5.0 | | | | | |
| B-5 | | | | | | 5.0 | | | | |
| B-6 | | | | | | | 5.0 | | | |
| B-7 | | | | | | | | 5.0 | | |
| B-8 | | | | | | | | | 5.0 | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total (mass %) | 100.0 | 100.0 | 100.0 | 100.0 | 100.0 | 100.0 | 100.0 | 100.0 | 100.0 | 100.0 |

TABLE 7

| | Comparative Example | | | | | |
|---|---|---|---|---|---|---|
| | 11 | 12 | 13 | 14 | 15 | 16 |
| A1-1-1 | 94.8 | | 84.8 | | | |
| A1-1-2 | | 94.8 | | 84.8 | | |
| A1-1-3 | | | | | | |
| A1-1-4 | | | | | | |
| A1-1-5 | | | | | | |
| A1-1-6 | | | | | | |
| A1-1-7 | | | | | | |
| A1-1-8 | | | | | | |
| A1-2-1 | | | | | 94.8 | |
| A1-2-2 | | | | | | 94.8 |
| A2-1 | | | | | | |
| A2-2 | | | | | | |
| A2-3 | | | | | | |
| A2-4 | | | | | | |
| A2-5 | | | | | | |
| A2-6 | | | | | | |
| A2-7 | | | | | | |
| A2-8 | | | | | | |
| A3-1 | | | 10.0 | | | |
| A3-2 | | | | 10.0 | | |
| B-1 | 5.0 | 5.0 | | | | |
| B-2 | | | | | | |
| B-3 | | | 5.0 | 5.0 | | |
| B-4 | | | | | 5.0 | |
| B-5 | | | | | | 5.0 |
| B-6 | | | | | | |
| B-7 | | | | | | |
| B-8 | | | | | | |
| Polymerization inhibitor | 0.1 | 0.1 | 0.1 | 0.1 | 0.1 | 0.1 |
| Surfactant | 0.1 | 0.1 | 0.1 | 0.1 | 0.1 | 0.1 |
| Total (mass %) | 100.0 | 100.0 | 100.0 | 100.0 | 100.0 | 100.0 |

<Formation of Cured Product by Inkjet>

A plastic storage container was charged with each composition, and the storage container was mounted in an image forming apparatus including an inkjet head (MH5440, available from Ricoh Company Limited) serving as an ejection unit, a UV-LED (LED ZERO, available from INTEGRATION TECHNOLOGY LTD., wavelength: 395 nm, illuminance on illumination surface: 1.0 W/cm$^2$) serving as an active energy-ray irradiation unit, a controller configured to control ejection, and a supply channel from the storage container and the inkjet head.

The temperature of the inkjet head was appropriately adjusted to adjust the viscosity of the composition in the range of from 10 mPa·s through 12 mPa·s. The composition was ejected onto a readily available film material, that was a commercially available PET film (COSMOSHINE A4100 available from TOYOBO CO., LTD., thickness: 188 μm) by inkjet to give a film thickness of 10 μm, followed by performing UV ray irradiation with the UV-LED, to thereby produce a cured product.

<Curability>

The state of each cured product on which stickiness was not felt with fingers when touched with the fingers was determined as cured. The integrated irradiation light dose required for curing was determined. The results are presented in Tables 8 to 13. The case where the integrated irradiation light dose required for curing was 1.0 J/cm² or less was determined as practically usable.

<Evaluation of Adhesion>

The adhesion between each of the obtained cured product and the base was evaluated as follows. As a generic film material widely used as a wrapping material or industrial material, a commercially available PET film (ester film E5100, available from TOYOBO CO., LTD., average thickness: 100 μm) was used. Each composition was ejected onto a processed surface of the PET film through a corona treatment and onto an unprocessed surface of the PET film. The ejected composition was cured by light irradiation performed by a UV irradiator (LH6 (D bulb), available from Heraeus Holding) to obtain a cured product. A cross-cut method as specified in JIS-K-5600-5-6 was performed on the obtained cured product, and the "adhesion" was evaluated based on the following evaluation criteria. The results are presented in Tables 8 to 13.

[Evaluation Criteria]

A: No peeling was observed.

B: Only slight peeling in the degree of 5% or greater but less than 20% was observed.

C: Peeling in the degree of 20% or greater but less than 50% relative to the total area was observed.

D: Peeling in the degree of 50% or greater was observed.

TABLE 8

| | Example | | | | | | | | | |
|---|---|---|---|---|---|---|---|---|---|---|
| | 1 | 2 | 3 | 4 | 5 | 6 | 7 | 8 | 9 | 10 |
| Integrated irradiation light dose required for curing (J/cm²) | 0.5 | 0.8 | 0.5 | 0.8 | 0.5 | 0.6 | 0.6 | 0.5 | 0.6 | 0.5 |
| Adhesion | A | A | A | A | A | A | A | A | B | B |

TABLE 9

| | Example | | | | | | | | | |
|---|---|---|---|---|---|---|---|---|---|---|
| | 11 | 12 | 13 | 14 | 15 | 16 | 17 | 18 | 19 | 20 |
| Integrated irradiation light dose required for curing (J/cm²) | 0.5 | 0.6 | 0.5 | 0.8 | 0.5 | 0.7 | 0.6 | 0.7 | 0.6 | 0.6 |
| Adhesion | B | B | A | A | A | A | A | B | B | B |

TABLE 10

| | Example | | | | | | | | | |
|---|---|---|---|---|---|---|---|---|---|---|
| | 21 | 22 | 23 | 24 | 25 | 26 | 27 | 28 | 29 | 30 |
| Integrated irradiation light dose required for curing (J/cm²) | 0.7 | 0.8 | 0.6 | 0.7 | 0.9 | 0.6 | 0.8 | 0.9 | 0.9 | 0.8 |
| Adhesion | A | B | A | A | B | A | B | A | B | A |

TABLE 11

| | Example | | | | | | | | | |
|---|---|---|---|---|---|---|---|---|---|---|
| | 31 | 32 | 33 | 34 | 35 | 36 | 37 | 38 | 39 | 40 |
| Integrated irradiation light dose required for curing (J/cm²) | 0.7 | 0.8 | 0.9 | 0.8 | 0.7 | 0.7 | 0.9 | 1.0 | 1.0 | 1.0 |
| Adhesion | B | B | B | B | B | B | B | B | B | B |

TABLE 12

| | Comparative Example | | | | | | | | | |
|---|---|---|---|---|---|---|---|---|---|---|
| | 1 | 2 | 3 | 4 | 5 | 6 | 7 | 8 | 9 | 10 |
| Integrated irradiation light dose required for curing (J/cm²) | *1 | *2 | 0.5 | 0.5 | *1 | *2 | 0.6 | *1 | *1 | 0.5 |
| Adhesion | D | D | D | D | D | C | C | C | C | D |

*In Table 12, "*1" means that the composition was not cured with the integrated irradiation light dose of 100 J/cm².
*In Table 12, "*2" means that the polymerization initiator could not be dissolved in the composition and the evaluation itself could not be performed.

TABLE 13

| | Comparative Example | | | | | |
|---|---|---|---|---|---|---|
| | 11 | 12 | 13 | 14 | 15 | 16 |
| Integrated irradiation light dose required for curing (J/cm²) | 1.0 | 0.9 | 1.0 | 0.9 | 0.8 | 1.1 |
| Adhesion | D | D | C | C | D | C |

For example, embodiments of the present disclosure are as follows.

<1> A composition including:
an acrylamide compound having a molecular weight of 150 or greater but 250 or less (A1); and
a monomer having a cyclic structure represented by General Formula (3) below, or General Formula (4) below, or both (A2),

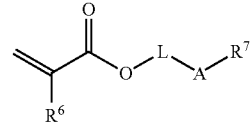

General Formula (3)

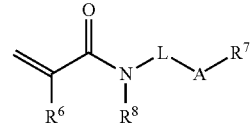

General Formula (4)

where, in General Formulae (3) and (4), L is a single bond or a straight chain or branched alkylene group that has from 1 through 10 carbon atoms and may include an oxygen atom, a nitrogen atom, or a sulfur atom; A is a cyclic structure that has from 2 through 10 carbon atoms and may include an oxygen atom, a nitrogen atom, or a sulfur atom; $R^6$ is a hydrogen atom or a methyl group; and $R^7$ and $R^8$ are each a straight chain or branched alkyl group having from 1 through 10 carbon atoms.

<2> The composition according to <1>,
wherein the acrylamide compound (A1) is represented by General Formula (1) below, or General Formula (2) below, or both,

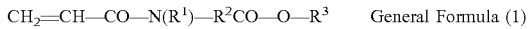
$$CH_2=CH-CO-N(R^1)-R^2CO-O-R^3 \quad \text{General Formula (1)}$$

where, in General Formula (1), $R^1$ is a hydrogen atom or a straight chain or branched alkyl group having from 1 through 4 carbon atoms, $R^2$ is a straight chain or branched alkylene group having from 1 through 4 carbon atoms, and $R^3$ is a straight chain or branched alkyl group having from 1 through 4 carbon atoms, with the proviso that a total number of carbon atoms of W, $R^2$, and $R^3$ is from 2 through 6, General Formula (2)

where, in General Formula (2), a ring X is a cyclic structure that includes a nitrogen atom and has from 2 through 5 carbon atoms, $R^4$ is a single bond or a straight chain or branched alkylene group having from 1 through 3 carbon atoms, and $R^5$ is a straight chain or branched alkyl group having from 1 through 3 carbon atoms, with the proviso that a total number of carbon atoms of the ring X, $R^4$, and $R^5$ is from 3 through 6.
<3> The composition according to <2>,
wherein the acrylamide compound (A1) is represented by General Formula (1) and $R^3$ is an alkyl group having from 1 through 2 carbon atoms.
<4> The composition according to any one of <1> to <3>, wherein the amount of the acrylamide compound (A1) is 20% by mass or greater but 98% by mass or less relative to a total amount of the composition.
<5> The composition according to any one of <1> to <4>, wherein the monomer having a cyclic structure (A2) is at least one selected from the group consisting of (meth)acryloylmorpholine, isobornyl (meth)acrylate, tetrahydrofurfuryl (meth)acrylate, t-butylcyclohexyl (meth)acrylate, and cyclohexyl (meth)acrylate.
<6> The composition according to any one of <1> to <5>, wherein an amount of the monomer having a cyclic structure (A2) is 5% by mass or greater but 40% by mass or less relative to a total amount of the composition.
<7> The composition according to any one of <1> to <6>, further including a polymerization initiator.
<8> The composition according to any one of <1> to <7>, wherein the composition is free of an organic solvent.
<9> The composition according to any one of <1> to <8>, wherein the composition is an active energy ray-curable composition.
<10> The composition according to any one of <1> to <9>, wherein the composition is an inkjet composition.
<11> A storage container including:
a container; and
the composition according to any one of <1> to <10>, where the composition is stored in the container.
<12> A two-dimensional or three-dimensional image forming apparatus, the apparatus including:
a container, in which the composition according to any one of <1> to <10> is stored;
an application unit configured to apply the composition; and
a curing unit configured to cure the composition.

<13> The apparatus according to <12>,
wherein the curing unit is a UV-LED configured to emit ultraviolet rays having a peak at a wavelength of 365 nm or longer but 405 nm or shorter.
<14> A two-dimensional or three-dimensional image forming method, the method including:
applying the composition according to any one of <1> to <10>; and curing the composition.
<15> The method according to <14>,
wherein the curing includes applying ultraviolet rays having a peak at a wavelength of 365 nm or longer but 405 nm or shorter using a UV-LED.
<16> A cured product obtained with the composition according to any one of <1> to <10>.
<17> A formed article obtainable by stretching the cured product according to <16>.
<18> A decorated article obtainable by applying on a base a surface decoration formed of the cured product according to <16>.

The composition according to any one of <1> to <10>, the storage container according to <11>, the two-dimensional or three-dimensional image forming apparatus according to <12> or <13>, the two-dimensional or three-dimensional image forming method according to <14> or <15>, the cured product according to <16>, the formed article according to <17>, and the decorated article according to <18> can solve the above-described various problems existing in the art and can achieve the object of the present disclosure.

What is claimed is:
1. A composition comprising:
an acrylamide compound having a molecular weight of 150 or greater but 250 or less (A1); and
at least one monomer (A2) selected from the group consisting of acryloyl morpholine, isobornyl acrylate, tetrahydrofurfuryl acrylate, cyclohexyl acrylate, t-butylcyclohexyl acrylate, N-vinylpyrrolidone, dicyclopentenyloxyethyl acrylate, and pentamethylpiperidinyl methacrylate
wherein the acrylamide compound (A1) is represented by General Formula (1), General Formula (2), or both:

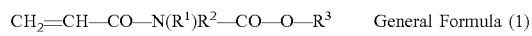
$$CH_2=CH-CO-N(R^1)R^2-CO-O-R^3 \quad \text{General Formula (1)}$$

wherein in General Formula (1), $R^1$ is a hydrogen atom or a straight chain or branched alkyl group having from 1 through 4 carbon atoms, $R^2$ is a straight chain or branched alkylene group having from 1 through 4 carbon atoms, and $R^3$ is a straight chain or branched alkyl group having from 1 through 4 carbon atoms, with the proviso that a total number of carbon atoms of $R^1$, $R^2$, and $R^3$ is from 2 through 6, General Formula (2)

wherein in General Formula (2), a ring X is a cyclic structure that includes a nitrogen atom and has from 2 through 5 carbon atoms, $R^4$ is a single bond or a straight chain or branched alkylene group having from 1 through 3 carbon atoms, and $R^5$ is a straight chain or branched alkyl group having from 1 through 3 carbon atoms, with the proviso that a total number of carbon atoms of the ring X, $R^4$, and $R^5$ is from 3 through 6.

2. The composition according to claim 1, wherein the acrylamide compound (A1) is represented by General Formula (1) and R' is an alkyl group having from 1 to 2 carbon atoms.

3. The composition according to claim 1, wherein the at least one monomer having a cyclic structure (A2) is selected from the group consisting of acryloylmorpholine, isobornyl acrylate, tetrahydrofurfuryl acrylate, t-butylcyclohexyl acrylate, and cyclohexyl acrylate.

4. The composition according to claim 1, wherein the at least one monomer having a cyclic structure (A2) is present in an amount of 5% by mass to 40% by mass relative to a total amount of the composition.

5. The composition according to claim 1, wherein the composition which is free of an organic solvent.

6. The composition according to claim 1, wherein the composition is an active energy ray-curable composition.

7. The composition according to claim 1, wherein the composition is an inkjet composition.

8. A storage container comprising:
a container; and
the composition according to claim 1 that is stored in the container.

9. A two-dimensional or three-dimensional image forming apparatus, the apparatus comprising:
a container, in which the composition according to claim 1 is stored;
an application unit configured to apply the composition; and
a curing unit configured to cure the composition.

10. The apparatus according to claim 9, wherein the curing unit is a UV-LED configured to emit ultraviolet rays having a peak at a wavelength of 365 nm or longer but 405 nm or shorter.

11. A two-dimensional or three-dimensional image forming method, the method comprising:
applying the composition according to claim 1; and
curing the composition.

12. The method according to claim 11, wherein the curing includes applying ultraviolet rays having a peak at a wavelength of 365 nm or longer but 405 nm or shorter using a UV-LED.

13. A cured product obtained by curing the composition according to claim 1.

14. A formed article obtained by stretching the cured product according to claim 13.

15. A decorated article obtained by applying on a base a surface decoration formed of the cured product according to claim 13.

* * * * *